(12) United States Patent
Edovia et al.

(10) Patent No.: US 11,513,046 B2
(45) Date of Patent: Nov. 29, 2022

(54) FLOWABILITY TESTING SYSTEMS AND METHODS

(71) Applicant: CHAMPIONX USA Inc., Sugarland, TX (US)

(72) Inventors: Theophilus Edovia, Richmond, TX (US); Vittoria Balsamo-Hernandez, Fulshear, TX (US); Marcus D. Faust, Jr., Naperville, IL (US); Rogelio Banda, Houston, TX (US); Wilfredis Medina-Melendez, Richmond, TX (US); Kenneth W. Dorris, Richmond, TX (US); Tyler D. Boyd, Houston, TX (US)

(73) Assignee: CHAMPIONX USA Inc., Sugarland, TX (US)

( * ) Notice: Subject to any disclaimer, the term of this patent is extended or adjusted under 35 U.S.C. 154(b) by 266 days.

(21) Appl. No.: 16/270,890

(22) Filed: Feb. 8, 2019

(65) Prior Publication Data
US 2019/0250085 A1    Aug. 15, 2019

Related U.S. Application Data

(60) Provisional application No. 62/628,336, filed on Feb. 9, 2018.

(51) Int. Cl.
*G01N 11/06* (2006.01)
*G01N 11/00* (2006.01)
(Continued)

(52) U.S. Cl.
CPC ............... *G01N 11/06* (2013.01); *G01F 1/74* (2013.01); *G01G 17/04* (2013.01); *G01N 2011/002* (2013.01)

(58) Field of Classification Search
CPC ...................................................... G01N 11/06
See application file for complete search history.

(56) References Cited

U.S. PATENT DOCUMENTS 2,092,223 A * 9/1937 Payne .................... G01N 11/06
                                                  73/54.11
2,141,329 A * 12/1938 Zahn ...................... G01N 11/06
                                                  73/54.11
(Continued)

FOREIGN PATENT DOCUMENTS

CA       2308414 A1 * 5/1999 ................ B01L 9/06
CN     103728219 A  * 4/2014
(Continued)

OTHER PUBLICATIONS

Dr. A Rajesh Kanna et al., "Determination of Oil, Water, Solid and Clay Content in Various Concentrations of Bentonite & Sodium Silicate", International Journal of Innovative Research in Science, Engineering and Technology, vol. 6, No. 4, Apr. 2017. (Year: 2017).*

(Continued)

*Primary Examiner* — David A. Rogers
(74) *Attorney, Agent, or Firm* — Stinson LLP

(57) ABSTRACT

Systems and methods for assessing flowability of a multiphase fluid are provided. The method includes agitating a sample of the multiphase fluid contained in a container while controlling an agitation force applied to the sample; pouring the sample, after it has been agitated, into a viscosity cup having an opening at its upper end and an orifice at its lower end and thereby causing the multiphase fluid to flow out of the viscosity cup through the orifice; weighing an amount of the multiphase fluid that has flowed through the orifice and into a receiving vessel over a period of time; and assessing flowability of the multiphase fluid sample using the weight (Continued)

of the multiphase fluid sample in the receiving vessel as a function of time.

14 Claims, 3 Drawing Sheets

(51) Int. Cl.
*G01F 1/74* (2006.01)
*G01G 17/04* (2006.01)

(56) References Cited

U.S. PATENT DOCUMENTS

| | | | | |
|---|---|---|---|---|
| 2,673,722 | A * | 3/1954 | Griffin | B01F 11/0022 366/212 |
| 2,836,975 | A * | 6/1958 | Euverard | G01N 11/06 73/54.11 |
| 3,989,869 | A * | 11/1976 | Neumaier | B32B 27/00 442/226 |
| 4,102,649 | A * | 7/1978 | Sasaki | B01F 11/0014 366/114 |
| 4,202,634 | A * | 5/1980 | Kraft | B01F 11/0031 366/111 |
| 4,362,179 | A * | 12/1982 | MacPhee | B41F 31/005 101/364 |
| 4,400,973 | A * | 8/1983 | Hegedus | G01N 11/04 73/54.04 |
| 4,449,394 | A | 5/1984 | Hegedus | |
| 4,662,030 | A * | 5/1987 | Cooper | G01N 11/06 73/224 |
| 4,794,787 | A * | 1/1989 | Gordon | G01N 11/04 73/54.12 |
| 4,799,378 | A * | 1/1989 | Portman, Jr | G01G 3/13 374/117 |
| 4,923,622 | A * | 5/1990 | Sherman | C11D 3/2006 510/525 |
| 5,155,156 | A * | 10/1992 | Scanley | C08J 3/09 524/366 |
| 5,191,211 | A * | 3/1993 | Gorman, Jr. | G01N 30/06 250/282 |
| 5,372,034 | A * | 12/1994 | Burke | G01N 11/04 73/54.13 |
| 5,608,693 | A * | 3/1997 | Richards | B01F 11/0005 366/114 |
| 5,934,804 | A * | 8/1999 | Branson | B01F 11/0022 366/208 |
| 5,959,194 | A | 9/1999 | Nenniger | |
| 6,190,032 | B1 * | 2/2001 | Choda | B01F 11/0014 366/208 |
| 6,579,002 | B1 * | 6/2003 | Bartick | B01F 11/0008 366/112 |
| 6,764,214 | B2 * | 7/2004 | Shukla | B01F 11/0008 366/209 |
| 7,059,762 | B2 * | 6/2006 | Yi | B01F 11/0005 366/208 |
| 7,190,639 | B2 * | 3/2007 | Larson | G01N 11/06 73/54.13 |
| 7,351,755 | B2 * | 4/2008 | Hori | C08G 18/2835 523/201 |
| 7,398,703 | B2 * | 7/2008 | Nath | G01N 1/40 73/23.35 |
| 7,516,648 | B2 * | 4/2009 | Terentiev | G01M 3/187 383/101 |
| 7,628,848 | B2 * | 12/2009 | Saldarriaga | C11D 3/3765 106/287.26 |
| 7,707,878 | B2 | 5/2010 | Kanayama et al. | |
| 7,802,462 | B2 * | 9/2010 | Standiford | G01F 25/0046 73/1.16 |
| 8,016,218 | B1 * | 9/2011 | Friedman | B01F 11/0017 241/175 |
| 8,215,826 | B2 * | 7/2012 | Zuppiger | B01F 11/0034 366/208 |
| 8,522,896 | B2 * | 9/2013 | Rowden | E21B 21/08 175/38 |
| 8,620,636 | B2 | 12/2013 | Zhan et al. | |
| 8,726,747 | B2 * | 5/2014 | Kennett | G01N 1/2035 73/864.51 |
| 9,303,509 | B2 | 4/2016 | Milkovisch et al. | |
| 9,346,993 | B2 * | 5/2016 | Iwamura | C09D 167/00 |
| 9,453,156 | B2 * | 9/2016 | Wu | C09K 8/487 |
| 10,301,928 | B2 * | 5/2019 | Burks | G01N 33/2823 |
| 10,618,048 | B2 * | 4/2020 | Beikler | B01L 3/508 |
| 10,731,428 | B2 * | 8/2020 | Ross | B01D 21/26 |
| 2002/0058601 | A1 * | 5/2002 | Jordan, IV | D21H 21/22 510/421 |
| 2005/0187115 | A1 * | 8/2005 | Anthony | C10M 169/04 508/136 |
| 2007/0212265 | A1 * | 9/2007 | Ebers | B01F 11/0014 422/400 |
| 2007/0236215 | A1 | 10/2007 | Innes et al. | |
| 2009/0031816 | A1 * | 2/2009 | Henderson | G01R 31/2849 73/663 |
| 2011/0130966 | A1 | 6/2011 | Zhan et al. | |
| 2012/0108472 | A1 * | 5/2012 | Wu | C09K 8/516 507/112 |
| 2014/0053637 | A1 * | 2/2014 | Quillien | E21B 21/062 73/54.01 |
| 2015/0158951 | A1 * | 6/2015 | Brisbane | C07K 16/00 424/142.1 |
| 2015/0359941 | A1 * | 12/2015 | Llull | A61L 27/20 435/381 |
| 2016/0058863 | A1 * | 3/2016 | Johnston | A61K 9/10 424/177.1 |
| 2017/0058670 | A1 | 3/2017 | Hassell | |
| 2017/0191008 | A1 * | 7/2017 | Baseeth | C11D 17/0021 |

FOREIGN PATENT DOCUMENTS

| | | | |
|---|---|---|---|
| CN | 206114466 U | * | 4/2017 |
| CN | 206756636 U | * | 12/2017 |
| CN | 207300798 U | * | 5/2018 |
| GB | 852649 A | * | 10/1960 |
| JP | 61149079 A | * | 7/1986 ......... B01F 11/0008 |

OTHER PUBLICATIONS

Machine Translation of CN-207300798-U Which Originally Published on May 1, 2018. (Year: 2018).*
Machine Translation of CN-206756636-U Which Originally Published on Dec. 15, 2017. (Year: 2017).*
Machine Translation of CN-206114466-U Which Originally Published on Apr. 19, 2017. (Year: 2017).*
Machine Translation of CN-103728219-A Which Originally Published on Apr. 16, 2014. (Year: 2014).*
"How to Use a BYK-Gardner Ford Viscosity Cup to Measure Viscosity" to QC Instruments, available on the internet at https://www.youtube.com/watch?v=LJDmQt_xpco on Aug. 17, 2010. (Year: 2010).*
TQC Viscosity Cups, to TQC, available on the internet at https://www.youtube.com/watch?v=VWV6hpaaWJQ on Mar. 27, 2011. (Year: 2011).*
"Saybolt Viscometer (Efflux Cup Viscometers)", available on the internet at https://instrumentationandcontrollers.blogspot.com/2012/09/saybolt-viscometer-efflux-cup.html on Sep. 12, 2012. (Year: 2012).*

* cited by examiner

FLOWABILITY TESTING SYSTEMS AND METHODS

CROSS REFERENCE TO RELATED APPLICATIONS

This application claims priority to U.S. Provisional Patent Application Ser. No. 62/628,336 filed on Feb. 9, 2018, the disclosure of which is incorporated herein by reference in its entirety.

STATEMENT REGARDING FEDERALLY SPONSORED RESEARCH OR DEVELOPMENT

Not applicable

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable

FIELD OF INVENTION

The invention relates generally to systems and methods for evaluating flowability of multiphase fluids, such as the fluids produced from petroleum wells, and more particularly to systems and methods for evaluating how different chemicals may affect the flowability of such fluids.

BACKGROUND OF THE INVENTION

Crude oil is a mixture of a large number of different hydrocarbons. The exact composition varies from one region to the next and even from one oil field to the next. The composition of fluids produced from a particular well can also vary over time. One issue that can affect production is the flowability of the petroleum production fluids. There is often a desire to increase the flowability of the petroleum fluids to facilitate higher production levels. Flowability can sometimes be impaired by deposition of paraffin or other materials in the downhole formation, in the well string, wellhead, and/or in pipelines at the surface. These deposits decrease the flow area and thereby increase resistance to flow. External variables of the produced fluids can also affect flowability. These variables may include environmental conditions, such as temperature and the amount of turbulence, shear, or other variables that may affect flowability of the petroleum fluids.

Various commercially available chemical products are used to try to improve production. For example, one type of chemical is referred to as a flow improver. Flow improvers work by decreasing apparent viscosity of the produced fluids, for example, by creating an oil/water dispersion. The oil in water dispersion can be created by adding water or brine to the well. Another type of chemical is referred to as a paraffin inhibitor. Paraffin inhibitors work by limiting the amount of material deposited by the petroleum fluids, such as by modifying the structure of paraffin or by increasing the dispersion of the paraffin. Other types of chemicals may also be used.

Although these treatment products are useful, it is often not known which specific products will work best for a particular site. The composition and chemistry of the petroleum fluids can vary substantially from oil field to oil field and even between wells within the same oil field. Moreover, the composition and chemistry of the petroleum fluids can affect the effectiveness of flow improvers, paraffin inhibitors, and other chemicals in ways that are difficult to predict.

Thus, the oil industry has developed a practice of running bench-scale tests to identify suitable chemical treatments for use with specific oil production fluids sampled from the field. The conventional field test involves adding a chemical treatment to a bottle containing a sample of the produced fluids from the site. The bottle is shaken and visual observations are used to assess how the chemical treatment has affected flowability and deposition. Although the on-site bottle test offers the advantage of rapid feedback on the effectiveness of a particular chemical treatment, the results are subjective and there is very little and often inaccurate quantitative data. Thus, it is difficult to compare the effectiveness of multiple different treatment options.

Improved systems and methods, which will be described below, have been developed for laboratory testing effectiveness of different chemical treatments on flowability and deposition characteristics of produced fluids.

BRIEF SUMMARY OF THE INVENTION

A system for assessing flowability of a multiphase fluid is provided. The system comprises: an agitation system assembly for agitating a sample of the multiphase fluid contained in a container; a temperature control assembly configured to control the temperature of the sample while it is being agitated; a viscosity cup having an opening at its upper end through which the sample can be poured into the viscosity cup and an orifice through which the multiphase fluid in the sample can flow out of the viscosity cup, wherein the orifice has a smaller cross-sectional flow area than the opening at the upper end of the viscosity cup; a scale for weighing the amount of the multiphase fluid that has flowed through the orifice and been received in a receiving vessel on the scale, the scale being configured to output a signal indicating the weight currently registered by the scale; and a processor configured to receive the signal from the scale and to assess flowability of the multiphase fluid sample using the weight of the multiphase fluid sample in the receiving vessel as a function of time.

A method of assessing flowability of a multiphase fluid is also provided. The method comprises: agitating a sample of the multiphase fluid contained in a container while controlling an agitation force applied to the sample; pouring the sample, after it has been agitated, into a viscosity cup having an opening at its upper end and an orifice at its lower end and thereby causing the multiphase fluid to flow out of the viscosity cup through the orifice; weighing an amount of the multiphase fluid that has flowed through the orifice and into a receiving vessel over a period of time; and assessing flowability of the multiphase fluid sample using the weight of the multiphase fluid sample in the receiving vessel as a function of time.

BRIEF DESCRIPTION OF THE SEVERAL VIEWS OF THE DRAWINGS

Corresponding reference characters indicate corresponding parts throughout the drawings.

DETAILED DESCRIPTION OF THE INVENTION

Figure 1:
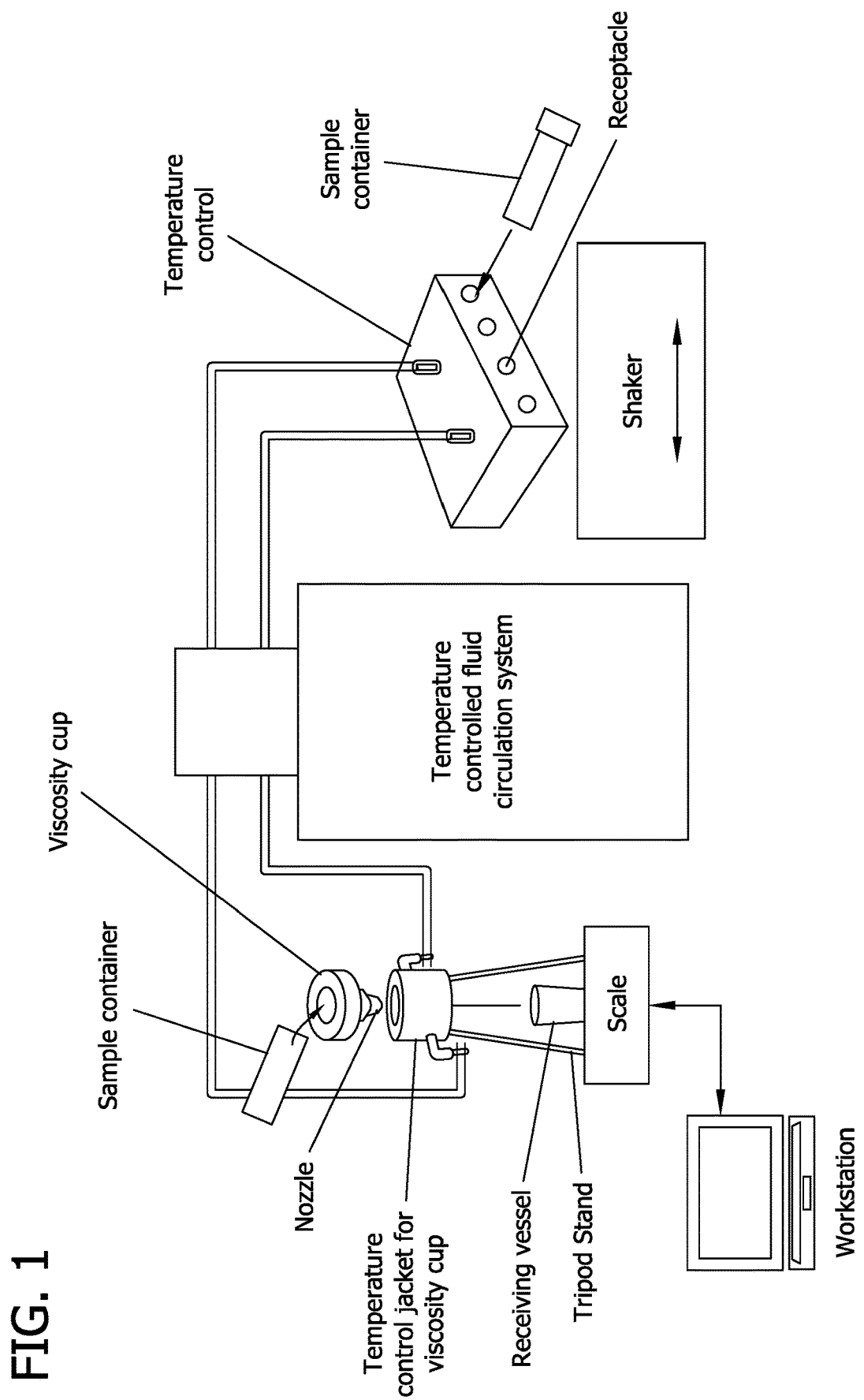
FIG. 1 is a schematic diagram of one embodiment of a test system for evaluating flowability and deposition characteristics of a multiphase fluid, such as petroleum production fluids.

Referring to FIG. 1, one embodiment of a system for assessing flowability of a multiphase fluid is illustrated schematically. The system is suitable for use in assessing flowability of a multiphase fluid. For example, the system can be used to assess flowability of a mixture of oil and water (e.g., produced water, synthetic brine, tap water, sea water, municipal water, etc.) produced from a petroleum well or oilfield. The system can be used with other fluids such as water-in-oil emulsion and diluted crude oil.

The system includes an agitation system for agitating a sample of the multiphase fluid while the fluid is contained in a container. In the illustrated embodiment, for example, the agitation system includes a shaker that is configured to shake one or more containers back and forth in a linear reciprocating fashion. The agitation system is suitably configured to selectively vary how vigorously the fluid is agitated. For example, the shaker in FIG. 1 is suitably configured to shake the container placed in the temperature control jacket for agitation at different speeds and includes an input device (e.g., dial or keypad) that allows a user to adjust the speed of the shaker. Although the system in FIG. 1 uses a linear reciprocating shaker as the agitation system, it is understood that other types of agitation systems can be used if desired. For example, the agitation system could be an oscillatory rocker, or other suitable types of agitation systems if desired.

The system includes a temperature control system configured to control the temperature of the sample while it is being agitated. As illustrated in FIG. 1, for example, the temperature control system includes a jacket configured to surround the container as it is being agitated. In the illustrated embodiment the jacket includes a plurality of receptacles (e.g., four receptacles) for holding multiple different containers for simultaneous agitation of the containers to perform several experiments in parallel. The jacket is configured to receive a temperature-controlled circulating fluid to control the temperature of container and its contents. In the illustrated embodiment, for example, the jacket is connected by fluid lines to one of the outputs of a temperature controlled fluid circulation unit. The fluid circulation unit suitably includes a heater and also a chiller so that the fluid (e.g., mixture of water and coolant, or mineral oil) provided to the jacket can be heated above the ambient temperature or cooled below the ambient temperature. This allows substantial flexibility in how the temperature is controlled during agitation, which may be desirable for evaluating a wide range of experimental conditions. For example, it may be desirable to heat the container for at least a part of the agitation to replicate downhole conditions at a wellsite. On the other hand, it may be desirable to cool the container for some, or all, of the agitation to replicate surface conditions, especially during colder winter months. It is understood, however, that it is not necessary that the system has the ability to heat and/or cool the container.

The system also includes a viscosity cup. Viscosity cups have long been used to measure the viscosity of paints and other homogeneous fluids. In general, a viscosity cup is a funnel, nozzle, or vessel having an open upper end for receiving the fluid under test and an orifice through which the fluid can drain under the influence of gravity. The orifice has a smaller cross-sectional flow area than the opening at the upper end of the viscosity cup so drainage of the fluid through the orifice is restricted by the small diameter of the orifice. In conventional use of a viscosity cup, the amount of time it takes for a particular volume of fluid to flow through the orifice is calibrated using standard fluids having known viscosities so the time can be converted to a viscosity measurement. However, viscosity cups are not conventionally used with heterogeneous fluid mixtures (such as the oil and water mixtures produced in the petroleum industry) because the equations used for viscosity calculations are not valid when the fluid is a heterogeneous fluid.

The system also includes a scale for weighing the amount of the fluid that has flowed through the orifice of the viscosity cup. For example, the system suitably includes a scale for weighing a receiving vessel placed under the viscosity cup to collect the fluid after it has fallen through the orifice. The scale is suitably configured to output a signal indicating the weight currently registered by the scale.

The system also includes a temperature control system configured to control the temperature of the viscosity cup. In the illustrated embodiment, the same temperature control system is used to control the temperature of the container as it is being agitated and to control the temperature of the viscosity cup. In particular, a jacket is provided that is configured to receive and surround the outside of the viscosity cup. The jacket is configured to receive a temperature controlled fluid. As illustrated in FIG. 1, for example, the jacket for the viscosity cup is connected by fluid lines to the other output from the temperature controlled fluid circulation system that is used to control the jacket that surrounds the container on the agitation system. Thus, the temperature control system in FIG. 1 is configured to control the temperature of the viscosity cup and the jacket for the sample container. However, it is understood that two separate temperature control systems could be used to control independently the temperatures of the viscosity cup and the jacket for the sample container if desired. It is also understood that the temperature control system for the viscosity cup is optional and may be omitted within the broad scope of the invention.

The system includes a processor configured to receive the signal from the scale and to assess flowability by measuring a flow rate of the multiphase fluid sample using the weight of the multiphase fluid sample in the receiving vessel as a function of time. In the illustrated embodiment, the processor is illustrated as a computer workstation (e.g., PC) configured to receive the signal from the scale. However, it is understood that other types of processor could be used instead, including without limitation, tablet computers, smart phones, and the like. It is also recognized that the processor may be built into the scale so the processor and scale are an integrated unit, if desired. It is further envisioned that the processor can be a dedicated standalone processor designed and configured with the purpose of running the disclosed test.

The processor is suitably configured (e.g., by software, firmware, or other executable code) to record the weight measurements from the scale over time (e.g., as the contents of the viscosity cup fall into the receiving vessel) and extract flow rate data from these measurements. For example, the processor is suitably configured to record the weight measurement periodically (e.g., about 5 times per second). The processor is suitably configured to recognize the onset of flow from the viscosity cup and store only measurements after the time the weight of the receiving vessel starts increasing after the receiving vessel begins receiving fluid that has fallen from the viscosity cup.

The weight of the container after the sample has been poured out can be entered into a program of the processor, or a program separate from the processor, as a measure of a deposition characteristic of the multiphase fluid sample. The weight of the container after the sample has been poured out will include the tare weight of the container plus the weight of any material that has deposited on the inner surface(s) of the container. The processor may be suitably configured to subtract the tare weight of the container from the weight of the container after the sample has been poured out to determine the weight of the material that deposited on the container. For example, the container can be weighed by the scale before the sample is added to obtain the tare weight, in which case the processor can be suitably configured to store the tare weight for use in calculating the weight of the deposited material. Alternatively, the tare weight of the container (e.g., as provided by the container manufacturer) may be stored by the processor for use in calculating the weight of the deposited material.

If desired, the processor may control operation of the agitation system and the temperature control system for the container and/or viscosity cup. Alternatively, or additionally, the processor may be linked (e.g., wirelessly or by wired connection) to the temperature control system and/or agitation system to record experimental variables used during the course of experiments if desired.

Figure 2:
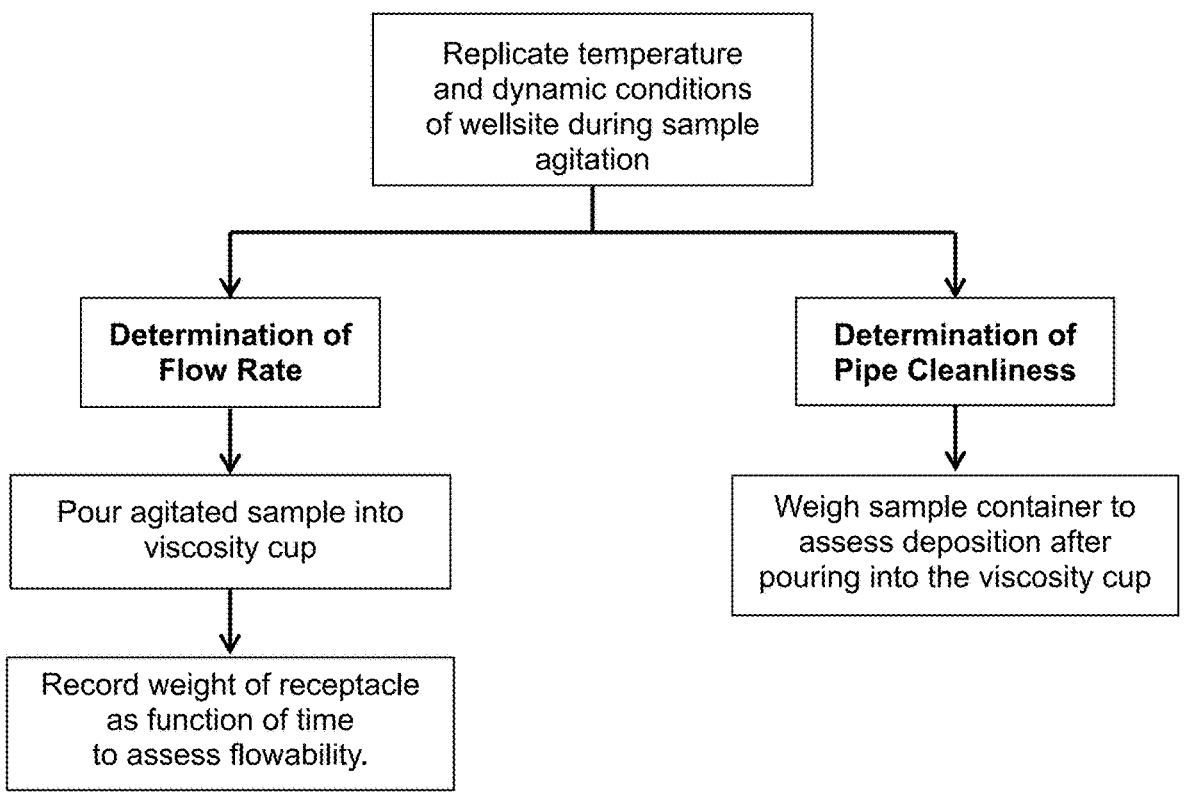
FIG. 2 is a flow diagram illustrating one embodiment of a method for evaluating flowability and deposition characteristics of a multiphase fluid, such as paraffinic petroleum production fluids.

Referring to FIG. 2, one embodiment of a method of assessing flowability of a multiphase fluid includes agitating a sample of the multiphase fluid in a container while controlling the temperature of the sample. For example, the sample fluid is suitably a produced petroleum well fluid. In general, it may be desirable to replicate the temperature and dynamic conditions of a wellsite during the sample agitation phase. For example, chemical treatments to combat flowability and/or deposition problems in the petroleum industry are typically injected into the downhole environment, where the temperature is relatively hot and the shear forces are relatively high. Thus, during an initial phase of agitation, it may be desirable to use a combination of vigorous agitation and high temperature to replicate the downhole environment.

On the other hand, deposition problems are commonly manifested as the petroleum fluids cool as they move up toward the surface. The surface environment is typically cooler than the downhole environment and may be associated with lower shear forces. Thus, it may be desirable to include a second phase of agitation in which the sample is agitated less vigorously and or the temperature is lowered to mimic conditions encountered as and after the petroleum fluids reach the surface.

Accordingly, the speed of the shaker of the system in FIG. 1 may be adjusted from a relatively high speed (for example, 280 strokes per minute) during the initial agitation phase to a relatively low speed (for example, 180 strokes per minute) during a later agitation phase. Likewise, the temperature control system may be adjusted to reduce the temperature of the container and its contents from a relatively higher temperature during the initial agitation phase to a relatively lower temperature during the later agitation phase. For example, if the processor is configured to control the agitation system and/or the temperature control system for the container, the processor is suitably configured to automatically reduce the agitation and/or temperature according to defined (either pre-defined or user defined) protocols. For applications involving use of the system outside the petroleum industry, the temperature control and agitation systems can be used to mimic the pertinent conditions for that application is much the same way.

The method can be used with fluids that have been treated with a chemical treatment intended to modify a characteristic of the fluid. The fluid can also be used with fluids that have not been treated that are used for controls or to learn other information about the fluids, such as how the fluids may be affected by different temperatures or dynamic conditions.

After the agitation is complete, the container is removed from the container jacket and opened. The sample in the container is poured into the viscosity cup so the sample fluid flows out of the viscosity cup through the orifice. The size of the viscosity cup orifice may be selected to impart a desired fluid flow. For example, the orifice size may be selected for producing a minimum fluid flow time. In one embodiment, the orifice is selected such that the fluid flow time is at least about 25 seconds. Optionally, the temperature control system is used to control the temperature of the viscosity cup (e.g., independently of the temperature during agitation). For example, the temperature of the viscosity cup can be controlled to be lower than the temperature during the agitation phase to mimic a temperature drop associated with movement of fluid from the downhole environment to the surface environment. A receiving vessel is used to collect the fluid after it has fallen through the viscosity cup orifice. The receiving vessel is weighed (e.g., using the scale) over a period of time (e.g., at about 0.2 second intervals) starting with the initial flow from the viscosity cup until after the flow rate has peaked. For example, it is suitable for a user to halt the weight measurements after observing the first break in a stream of fluid from the viscosity cup orifice.

Figure 3:
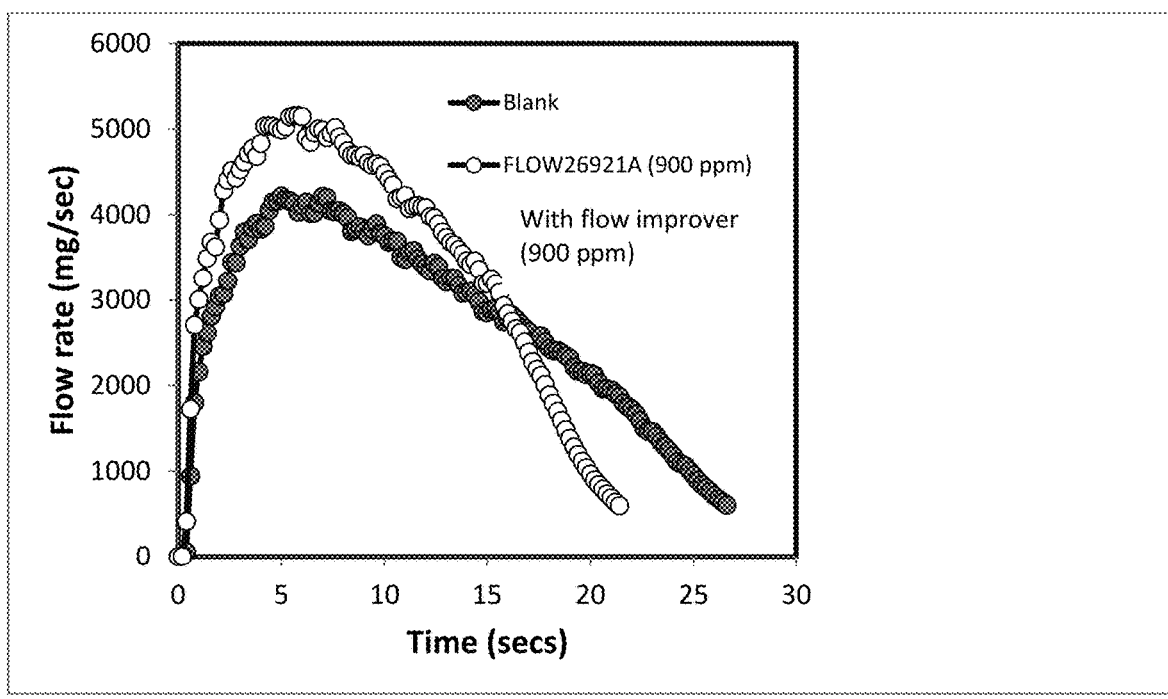
FIG. 3 is a graph of flow rate over time for a multiphase fluid evaluated using the test system.

The flowability of the sample is assessed using the weight of the fluid that has been received in the receiving vessel as a function of time. For example, the processor suitably analyzes the data from the scale and extracts flow rate information from this data. In one algorithm, the processor calculates the derivative on a neighborhood of a weight measurement to determine the flow rate of the fluid. In another algorithm, assuming the measurement samples are equally spaced in time, the processor calculates the difference in weight between consecutive measurements and identifies the maximum difference as the peak or maximum flow rate. However, if desired various smoothing algorithms may be used to reduce noise and potentially spurious instantaneous measurements before the peak flow rate is extracted from the data. The peak flow rate is used as a measure of the flowability of the sample. Higher peak flow rates will correspond with better flowability. The software may also generate a graph of flow rate over time such as the one shown in FIG. 3.

Any chemical treatments that may be added to the fluid sample can be added any time before the fluid sample is poured into the sample cup. In many cases it can be desirable to add the chemical treatment before the end of the agitation phase. For example, a chemical treatment is suitably added to the sample fluid before the agitation begins. If the sample includes oil from an oilfield and the oil is to be mixed with a synthetic brine to replicate the fluid produced by the oilfield, the chemical treatment is suitably added to the brine before the brine is mixed with the oil to constitute the multiphase fluid sample. In general, it may be desirable to add any chemical treatment (e.g., flow improvers, paraffin inhibitors, and combinations thereof) to a fluid sample before the agitation phase because the way chemical treatments are commonly applied in the field is with downhole injection, in which case addition of the chemical treatment before the agitation better mimics the field conditions. However, the system could also be used to mimic addition of chemical treatment at the surface (e.g., by waiting until later to add the chemical). Also, for applications outside the petroleum industry, it may be desirable to add a chemical treatment under study at different times, depending on the nature of the specific application.

After the sample has been poured out of the sample container into the viscosity cup, the sample container is suitably weighed to assess a deposition characteristic of the fluid sample, such as the ease with which material from the fluid sample is deposited on surfaces. Also, water quality may be assessed.

EXAMPLES

Example 1

An oil field has a history of producing paraffinic crude oils that are associated with deposition issues downhole on rod strings and also some solids deposition at the surface. The problems occur in both winter and summer months. A candidate chemical treatment (referred to herein as "Candidate 1") was selected based on its successful use at other locations to solve similar issues.

A sample of oil from this oil field was mixed with a synthetic brine representative of the composition of the water that had been produced along with the oil. In particular, the composition of the synthetic brine was as follows in Table 1:

TABLE 1

| Salts | Mass added to 3L of DI water(g) |
|---|---|
| KCL | 0.27 |
| $CaCl_2$ | 3.34 |
| $SrCl_2$ | 0.38 |
| $BaCl_2$ | 0.42 |
| $MgCl_2$ | 0.85 |
| $FeCl_2$ | 0.30 |
| $NaHCO_3$ | 2.25 |
| $Na_2SO_4$ | 0.29 |
| NaCl | 99.85 |

Samples were made of the oil from the oilfield (56 g) and the synthetic brine (24 g) in representative proportions (30% water cut). Some samples were untreated controls while others were treated with varying concentrations of Candidate 1. When the chemical treatment was added to make the experimental samples, the corresponding amount of Candidate 1 was added to the synthetic brine before the brine was mixed with the oil.

Each sample was preheated in a water bath at 160° F. for at least one hour. The downhole temperature at this location was 180° F. However, the viscosity cup used for this test had an upper limit of 160° F. Thus, 160° F. was selected as the temperature that would best match the downhole temperature.

Each sample was placed in a closed container jacketed with circulating fluid at a controlled temperature and placed on a reciprocating shaker. The container had a total volume of 120 mL so there was ample head space for mixing because there was only 80 g of fluid in the container. The container was shaken at high speed for 5 minutes to simulate downhole dispersion of the fluid sample. The temperature of the fluid circulating through the jacket during the dispersion creation phase varied from 50° F. to 160° F.

After 5 minutes of high-speed shaking, the shaker was optionally switched to a slower speed and left shaking for various periods of time ranging from 1 to 18 hours to simulate fouling conditions such as wellbore fouling, tubing fouling or wellhead fouling. The temperature of the water jacketing the container during the surface fouling phase was selected to be at various temperatures ranging from 50° F. to 106° F., which were selected to be representative of the temperature of the surface environment at different times of the year. In particular, the temperature was held at 50° F. for some samples to induce significant deposition, such as could be encountered at the surface during colder weather. The temperature was held at 72° F. for other samples to represent average field conditions. Also, the temperature was held at 106° F. to evaluate performance of the treatment at a temperature above typical field conditions but below the wax appearance temperature (WAT) for the oil being tested.

Fifteen total samples were tested, including the untreated controls. The conditions for each sample tested are set forth in Table 2 below.

TABLE 2

| Test Series No. | Water external dispersion creation phase | | | Fouling phase | | | Viscosity cup temp. T (° F.) |
|---|---|---|---|---|---|---|---|
| | Conc. (PPM) | T (° F.) | Shaker speed | T (° F.) | Shaker speed | Time (hrs.) | |
| 1 | 0, 1000, 2000 | 50 | High | 50 | Low | 1 | 50 |
| 2 | 0, 1000 | 50 | High | 50 | High | 1 | 50 |
| 3 | 0, 1000 | 50 | High | 50 | Low | 18 | 50 |
| 4 | 0, 1000 | 72 | High | 72 | Low | 18 | 72 |
| 5 | 0, 1000 | 72 | High | 72 | High | 1 | 72 |
| 6 | 0, 2000 | 160 | High | 72 | Low | 2 | 72 |
| 7 | 0, 2000 | 160 | High | 106 | Low | 2 | 106 |

After the surface fouling agitation period, the container was opened and the fluids therein were poured into a viscosity cup. The viscosity cup was surrounded by a water jacket with circulating water at temperatures ranging from 50° F. to 106° F. to control the temperature of the viscosity cup as the fluid was poured into it. A receiving vessel on a scale under the orifice of the viscosity cup collected the fluids after they fell through the orifice. The readings from the scale were periodically recorded as the receiving vessel filled with the fluids. The maximum flow rate was determined by analyzing the readings from the scale as a function of time. Flow rate increase was calculated as the percentage change in maximum flow rate produced by the chemical treatment compared to the untreated control under the same conditions. The container was weighed after it had been emptied. The tare weight of the container was subtracted from the post-test weight of the container to determine the amount of material that had deposited on the inner surface of the container. Surface cleaning efficiency was calculated as a percentage reduction in the amount of material deposited on the container compared to the untreated control under the same conditions.

The results of the tests are reproduced in Table 3 below.

TABLE 3

| Test Series No. | Conc. (PPM) | Max. Flow Rate (mg/s) | Flow rate increase (%) | Surface cleaning improvement (%) |
|---|---|---|---|---|
| 1 | 0 | 1116 | — | — |
| 1 | 1000 | 1014 | −9.1 | −8.9 |
| 1 | 2000 | 1066 | −4.5 | −11.3 |
| 2 | 0 | 1123 | — | — |
| 2 | 1000 | 1057 | −5.9 | 5.7 |
| 3 | 0 | 992 | — | — |
| 3 | 1000 | 1112 | 12.0 | −28.3 |
| 4 | 0 | 1155 | — | — |
| 4 | 1000 | 1355 | 17.4 | −5.2 |
| 5 | 0 | 1375 | — | — |
| 5 | 1000 | 1411 | 2.6 | −21.4 |
| 6 | 0 | 1357 | — | — |
| 6 | 2000 | 1251 | −7.8 | 23.7 |
| 7 | 0 | 1706 | — | — |
| 7 | 2000 | 1577 | −7.6 | 45.2 |

The results of the experiments in this example, show that Candidate 1 was not able to increase flowability and decrease surface deposition simultaneously. Under the test conditions that best mimicked the field conditions the treatment did decrease surface deposition, but it negatively impacted flowability. In some cases, the flow rate did increase, but such increases were accompanied by higher surface deposition. Thus, it appears the flow rate increase was due to a decrease of wax crystals in the fluid due to the higher amount of deposition on the container.

The results of this example are consistent with an unsuccessful field trial of Candidate 1 that had been conducted in the oil field after Candidate 1 successfully passed the conventional bottle test with visual observation. Thus, the results of the experiments provided in this example were more representative of the performance in the field than the conventional bottle test with visual observation.

Example 2

Another oil field (different from the one in Example 1) had been experiencing problems with deposit formation that had not been resolved by efforts to address the problems using various chemical paraffin control products. A series of tests were conducted to evaluate Candidate 1 (the same chemical as was tested in Example 1) as a potential treatment in this oil field.

Oil along with the produced water (brine) from this oil field was used for testing. The produced water separated from the oil upon standing. The produced water was added to samples of the oil to produce the various multiphase fluid samples that were tested. For some of the samples, the ratio of oil to produced water corresponded to a 30% water cut (56 g oil and 32 g water), while for other samples it corresponding to a 60% water cut (24 g oil and 48 g water). Each sample of the oil and produced water was preheated in a water bath at 149° F. (which was the downhole temperature for this location) for at least one hour.

Some samples were untreated controls while others were treated with varying concentrations of Candidate 1. When the chemical treatment was added to make the experimental samples, the corresponding amount of Candidate 1 was added to the produced water before the water was mixed with the oil.

Each sample was placed in a closed container jacketed with circulating water at a controlled temperature and placed on a reciprocating shaker. The container had a total volume of 120 mL so there was ample head space for mixing because there was only 80 g of fluid in the container. The container was shaken at high speed for 5 minutes to simulate downhole dispersion of the fluid sample. The temperature of the water circulating through the jacket during the dispersion creation phase varied from 77° F. to 149° F.

After 5 minutes of high-speed shaking, the shaker was switched to a slower speed and left shaking for various periods of time ranging from 1 to 2 hours to simulate surface fouling conditions. The temperature of the water circulating the container during the surface fouling phase was selected to be at various temperatures ranging from 41° F. to 93° F.

Twelve total samples were tested, including the untreated controls. The conditions for each sample tested are set forth in Table 4 below.

TABLE 4

| | Water external dispersion creation phase | | | | Surface fouling phase | | | Cup temp. |
|---|---|---|---|---|---|---|---|---|
| Test Series No. | Conc. (PPM) | $H_2o$ cut (%) | T (° F.) | Shaker speed | T (° F.) | Shaker speed | Time (hrs.) | T (° F.) |
| 1 | 0, 2000 | 30 | 149 | High | 93 | Low | 2 | 93 |
| 2 | 0, 2000 | 30 | 149 | High | 41 | Low | 2 | 50 |
| 3 | 0, 1000, 2000 | 60 | 149 | High | 93 | Low | 2 | 50 |
| 4 | 0, 1000, 2000 | 60 | 77 | High | 77 | Low | 1 | 77 |
| 5 | 0, 1000, 2000 | 30 | 77 | High | 77 | Low | 2 | 77 |

After the surface fouling agitation period, the container was opened and the fluids therein were poured into a viscosity cup. The viscosity cup was surrounded by a water jacket with circulating water at temperatures ranging from 50° F. to 93° F. to control the temperature of the viscosity cup as the fluid was poured into it. A receiving vessel on a scale under the orifice of the viscosity cup collected the fluids after they fell through the orifice. The readings from the scale were periodically recorded as the receiving vessel filled with the fluids. The maximum flow rate was determined by analyzing the readings from the scale as a function of time. Flow rate increase was calculated as the percentage change in maximum flow rate produced by the chemical treatment compared to the untreated control under the same conditions. The container was weighed after it had been emptied. The tare weight of the container was subtracted from the post-test weight of the container to determine the amount of material that had deposited on the inner surface of the container. Surface cleaning efficiency was calculated as a percentage reduction in the amount of material deposited on the container compared to the untreated control under the same conditions.

The results of the tests are reproduced in Table 5 below.

TABLE 5

| Test Series No. | Conc. (PPM) | Max. Flow Rate (mg/s) | Flow rate increase (%) | Surface cleaning improvement (%) |
|---|---|---|---|---|
| 1 | 0 | 1424 | — | — |
| 1 | 2000 | 1649 | 15.8 | 49.5 |
| 2 | 0 | 1195 | — | — |
| 2 | 2000 | 1382 | 15.7 | 28.1 |

TABLE 5-continued

| Test Series No. | Conc. (PPM) | Max. Flow Rate (mg/s) | Flow rate increase (%) | Surface cleaning improvement (%) |
|---|---|---|---|---|
| 3 | 0 | 895 | — | — |
| 3 | 1000 | 919 | 2.7 | 9.6 |
| 3 | 2000 | 929 | 3.4 | 2.4 |
| 4 | 0 | 849 | — | — |
| 4 | 1000 | 943 | 11.08 | 4.6 |
| 4 | 2000 | 908 | 6.95 | 7.3 |
| 5 | 0 | 797 | — | — |
| 5 | 1000 | 916 | 15.0 | 22.0 |

The results of the experiments in this example, show that Candidate 1 consistently improved both flowability and deposition rates simultaneously. Improvements were seen at the lower water cut (30%) and also at the higher water cut (60%). Improvements were also seen across all the temperatures that were tested.

Example 3

Oil from another location was tested to evaluate Candidate 1 in substantially the same way described above. The results are summarized in Table 6 below.

TABLE 6

| Temp of Fouling phase T(° F.) | Conc. (PPM) | Flow Rate improvement (%) | Surface Cleaning improvement (%) |
|---|---|---|---|
| 50 | 2000 | −4.5 | −12.0 |
| 72 | 2000 | −9.8 | 21.4 |
| 106 | 2000 | −8.0 | 43.5 |

The data show the Candidate 1 was not only unable to produce any improvement in flowability, but consistently made flowability worse. It was able to reduce surface deposition at higher temperatures, suggesting the flowability was impaired by a greater abundance of wax crystals in the fluid in association with the reduced deposition rate.

The results in this example were consistent with a field trial that showed Candidate 1 was unable to produce flow improvement at this location.

Example 4

Oil from yet another location was tested to evaluate Candidate 1 in substantially the same way described above. The results are summarized in Table 7 below.

TABLE 7

| Temp of Fouling phase T(° F.) | Conc. (PPM) | Flow Rate improvement (%) | Surface Cleaning improvement (%) |
|---|---|---|---|
| 104 | 500 | 2.9 | 0 |
| 104 | 1000 | 18.8 | 42.0 |

The data show the Candidate 1 was able to improve flowability and also deposition rate. The results in this example were consistent with a field trial in which Candidate 1 successfully improved flowability and deposition rate at this location.

Example 5

Oil from yet another location was tested to evaluate Candidate 1, Candidate 2, and a blend of Candidates 1 & 2 in substantially the same way described above. The blend was a ratio 9:1 ratio of Candidate 1 to Candidate 2. The results are summarized in Table 8 below.

TABLE 8

| Treatment | Temp of Fouling phase T(° F.) | Conc. (PPM) | Flow Rate improvement (%) | Surface Cleaning improvement (%) |
|---|---|---|---|---|
| Candidate 2 | 106 | 100 | −0.9 | 14.5 |
| Candidate 1 | 106 | 900 | 18.2 | 16.8 |
| Blend | 106 | 1000 | 12.8 | 19.3 |

The data show the Candidate 1 was able to improve flowability and also deposition rate. The blend was also able to improve flowability and deposition rate. Candidate 2 by itself was unable to improve flowability, although it was able to improve surface deposition rate. Candidate 1 by itself improved flowability significantly more than the blend, although the blend did perform slightly better than Candidate 1 with respect to limiting surface deposition. The results in this example were consistent with a field trial in which Candidate 1 successfully improved flowability and deposition rate at this location.

In view of the foregoing it will be appreciated that the systems and methods described herein provide a useful screening evaluation of how a candidate chemical treatment is likely to perform at a given location with respect to flowability and surface deposition characteristics. Moreover, this evaluation can be obtained quickly, at a laboratory using small sample volumes. It includes assessment of dynamic conditions that may affect the performance. It also allows flexible temperature control to help mimic various downhole and surface conditions that may be encountered in the field. Moreover, the data produced by the systems and methods described herein is objective data that can be quantized to facilitate comparison of various treatment options.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of assessing flowability of a multiphase fluid produced from a petroleum well or oilfield, the method comprising:
adding a candidate chemical treatment agent to a sample of the multiphase fluid produced from a petroleum well or oilfield contained in a container to form a treated sample;
agitating the treated sample of the multiphase fluid produced from a petroleum well or oilfield contained in a container while controlling an agitation force applied to the treated sample, wherein agitation of the sample has an initial phase where vigorous agitation and a temperature of from about 50° F. to about 162° F. is used and a second phase of agitation wherein less vigorous agitation as compared to the initial phase is used or in the second phase of agitation a temperature of about 50° F. to about 106° F. is used;

pouring the treated sample, after it has been agitated, into a viscosity cup having an opening at its upper end and an orifice at its lower end and thereby causing the multiphase fluid produced from a petroleum well or oilfield to flow out of the viscosity cup through the orifice;

weighing an amount of the multiphase fluid produced from a petroleum well or oilfield that has flowed through the orifice and into a receiving vessel over a period of time;

weighing the container after the treated sample has been poured out into the viscosity cup as a measure of a deposition characteristic of the treated multiphase fluid sample;

assessing flowability of the treated multiphase fluid sample produced from a petroleum well or oilfield using the weight of the treated multiphase fluid sample in the receiving vessel as a function of time and assessing the deposition of the treated multiphase fluid sample; and comparing the flowability and deposition of the treated multiphase fluid sample with an otherwise identical multiphase fluid sample that did not have the candidate chemical treatment agent added before agitation.

2. The method of claim 1 further comprising controlling a temperature of the viscosity cup while the sample is in the viscosity cup.

3. The method of claim 2 wherein controlling the temperature of the viscosity cup comprises controlling the temperature of the viscosity cup independently of the temperature of the sample while it is being agitated.

4. The method of claim 1 wherein the multiphase fluid comprises production petroleum fluids from a petroleum well.

5. The method of claim 1 wherein the candidate chemical treatment agent comprises a flow improver, a paraffin inhibitor, or a combination thereof.

6. The method of claim 1 wherein assessing flowability of the multiphase fluid sample using the weight of the multiphase fluid sample in the receiving vessel as a function of time comprises determining a maximum flow rate into the receiving vessel.

7. The method of claim 6 wherein the flowability of the treated multiphase fluid sample is compared with the flowability of the untreated multiphase fluid sample.

8. The method of claim 1 wherein the candidate chemical treatment agent comprises a flow improver.

9. The method of claim 1 wherein the multiphase fluid comprises a paraffinic crude oil.

10. The method of claim 9 wherein the candidate chemical treatment agent comprises a flow improver, a paraffin inhibitor, or a combination thereof.

11. The method of claim 1 wherein the sample of the multiphase fluid is prepared by mixing oil from an oilfield with a synthetic brine.

12. The method of claim 11 wherein the candidate chemical treatment agent is added to the brine before the brine is mixed with the oil.

13. A method of assessing flowability of a multiphase fluid produced from a petroleum well or oilfield, the method comprising:

adding a candidate chemical treatment agent to a sample of the multiphase fluid produced from a petroleum well or oilfield contained in a container to form a treated sample;

agitating the treated sample of the multiphase fluid produced from a petroleum well or oilfield contained in a container while controlling an agitation force applied to the treated sample;

pouring the treated sample, after it has been agitated, into a viscosity cup having an opening at its upper end and an orifice at its lower end and thereby causing the multiphase fluid produced from a petroleum well or oilfield to flow out of the viscosity cup through the orifice;

weighing an amount of the multiphase fluid produced from a petroleum well or oilfield that has flowed through the orifice and into a receiving vessel over a period of time;

weighing the container after the treated sample has been poured out into the viscosity cup as a measure of a deposition characteristic of the treated multiphase fluid sample;

assessing flowability of the treated multiphase fluid sample produced from a petroleum well or oilfield using the weight of the treated multiphase fluid sample in the receiving vessel as a function of time and assessing the deposition of the treated multiphase fluid sample; and comparing the flowability and deposition of the treated multiphase fluid sample with an otherwise identical multiphase fluid sample that did not have the candidate chemical treatment agent added before agitation, wherein a surface cleaning efficiency is calculated as a percentage reduction in the amount of material deposited on the container as compared to an untreated control under the same conditions.

14. The method of claim 13 wherein the surface cleaning efficiency of the treated multiphase fluid sample is compared with the surface cleaning efficiency of the untreated multiphase fluid sample.

* * * * *